United States Patent [19]
Meyer et al.

[11] Patent Number: 5,688,072
[45] Date of Patent: Nov. 18, 1997

[54] AGRICULTURAL DRIP TAPE

[75] Inventors: Larry P. Meyer, Walla Walla; Leland A. Perkins, Lowden; Charles R. Harrold, Walla Walla, all of Wash.

[73] Assignee: Micro Irrigation Technologies, Inc., Walla Walla, Wash.

[21] Appl. No.: 570,014

[22] Filed: Dec. 14, 1995

[51] Int. Cl.⁶ ..................................................... E02B 13/00
[52] U.S. Cl. .............................. 405/43; 239/542; 405/36; 405/45
[58] Field of Search .................... 405/36, 43, 45, 405/83, 81; 239/542, 145, 533.1

[56] References Cited

U.S. PATENT DOCUMENTS

| | | |
|---|---|---|
| 2,059,927 | 11/1936 | Beck ............................................ 405/83 |
| 3,361,359 | 1/1968 | Chapin . |
| 3,736,755 | 6/1973 | Hammond et al. . |
| 3,870,236 | 3/1975 | Sahagun-Barragan . |
| 3,896,999 | 7/1975 | Barragan . |
| 3,903,929 | 9/1975 | Mock . |
| 4,009,832 | 3/1977 | Tiedt . |
| 4,126,998 | 11/1978 | Gilead . |
| 4,177,946 | 12/1979 | Sahagun-Barragan . |
| 4,247,051 | 1/1981 | Allport . |
| 4,307,841 | 12/1981 | Mehoudar et al. . |
| 4,413,787 | 11/1983 | Gilead et al. . |
| 4,430,020 | 2/1984 | Robbins . |
| 4,437,431 | 3/1984 | Koch ........................................ 405/81 X |
| 4,473,191 | 9/1984 | Chapin . |
| 4,534,515 | 8/1985 | Chapin . |
| 4,572,756 | 2/1986 | Chapin . |
| 4,626,130 | 12/1986 | Chapin . |
| 4,629,361 | 12/1986 | Zimmerman ........................... 405/81 X |
| 4,642,152 | 2/1987 | Chapin . |
| 4,728,042 | 3/1988 | Gorney et al. ............................ 239/542 |
| 4,817,875 | 4/1989 | Karmeli et al. . |
| 4,874,132 | 10/1989 | Gilead . |
| 4,880,167 | 11/1989 | Langa et al. . |
| 4,958,772 | 9/1990 | Fabbri et al. ............................. 239/542 |
| 4,984,739 | 1/1991 | Allport . |
| 5,117,580 | 6/1992 | Brown ........................................ 47/95 |
| 5,118,042 | 6/1992 | Delmer . |
| 5,123,984 | 6/1992 | Allport et al. . |
| 5,163,622 | 11/1992 | Cohen . |
| 5,181,532 | 1/1993 | Brodefors et al. . |
| 5,183,208 | 2/1993 | Cohen . |
| 5,192,027 | 3/1993 | Delmer et al. ......................... 405/45 X |
| 5,203,503 | 4/1993 | Cohen . |
| 5,207,386 | 5/1993 | Mehoudar . |
| 5,263,791 | 11/1993 | Zeman . |
| 5,282,578 | 2/1994 | De Frank . |
| 5,318,657 | 6/1994 | Roberts . |
| 5,333,793 | 8/1994 | De Frank . |
| 5,364,032 | 11/1994 | De Frank ................................. 239/542 |
| 5,458,712 | 10/1995 | De Frank . |

*Primary Examiner*—Dennis L. Taylor
*Attorney, Agent, or Firm*—Nixon & Vanderhye P.C.

[57] ABSTRACT

Drip tape for below or above ground irrigation includes a sheet of material formed into a tube by overlapping opposite side edges of the sheet and bonding the side edges along a longitudinal seam thereby forming a primary flow path. A strip of transparent material is bonded to an interior surface of the sheet prior to seaming, at a location remote from the longitudinal seam so as to define, in combination with the tape wall, a plurality of secondary flow paths within the primary flow path. Each secondary flow path includes an inlet region, a turbulence inducing region and an outlet region; the inlet region including a plurality of inlets in the second strip connecting the primary flow path to the secondary flow path upstream of the turbulence inducing region; the outlet region including an outlet in the tube connecting the secondary flow path to atmosphere downstream of the turbulence inducing region.

26 Claims, 4 Drawing Sheets

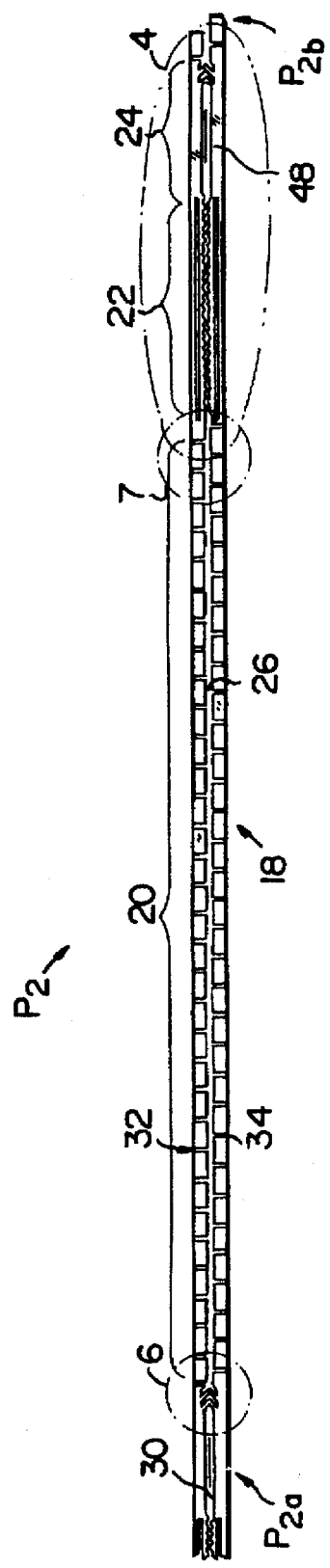
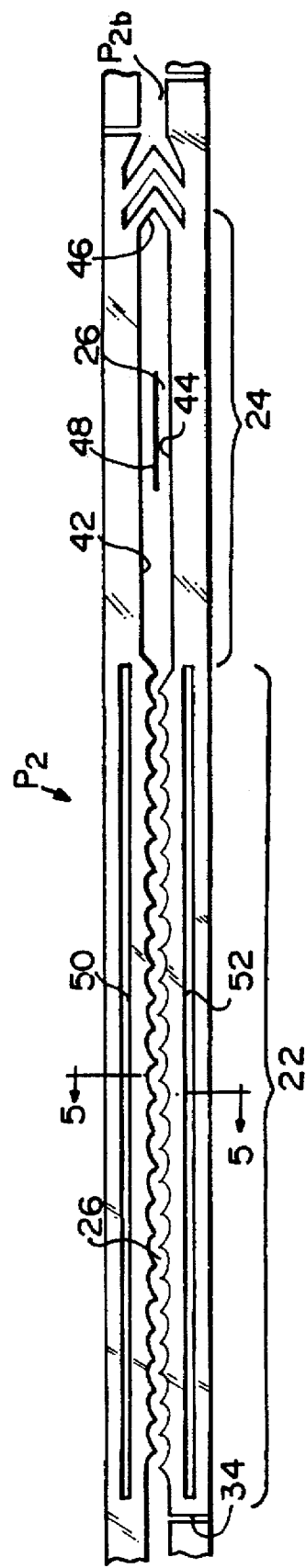

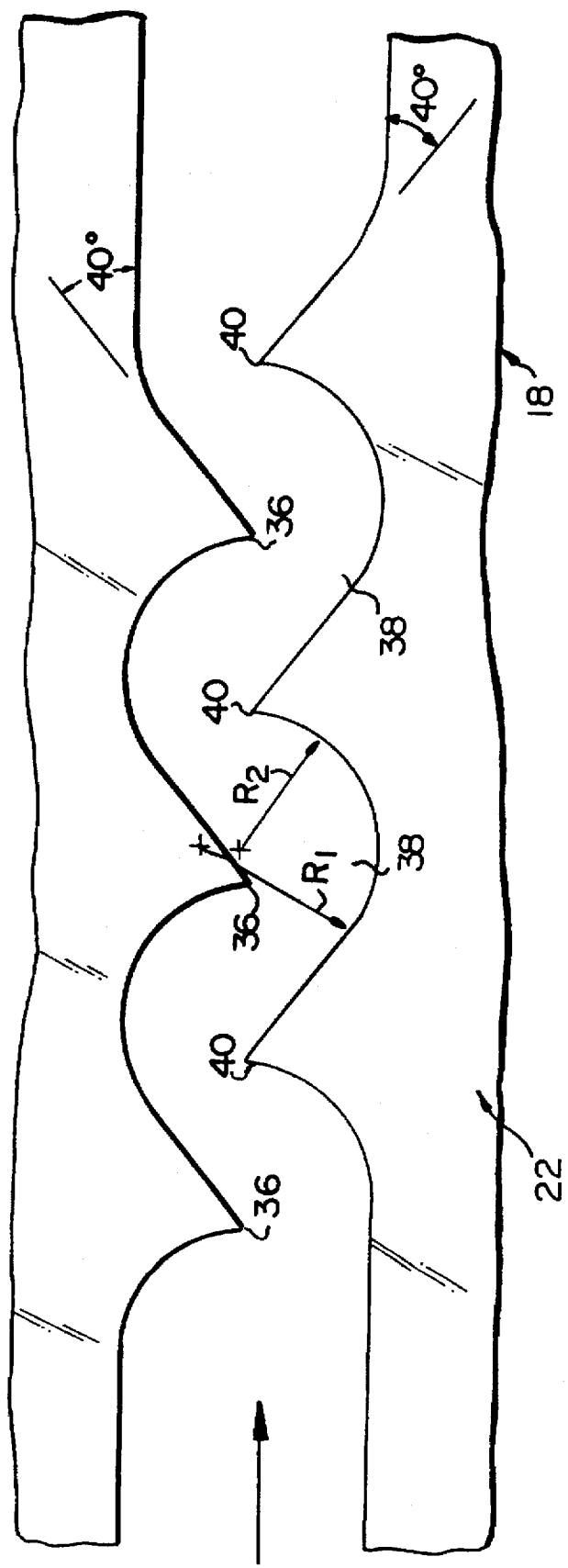

AGRICULTURAL DRIP TAPE

TECHNICAL FIELD

This invention relates to agricultural irrigation and specifically, to a drip tape or hose construction for below or above ground drip or trickle irrigation systems.

BACKGROUND

Drip irrigation hose or tape has been available now for several years.

Typically, agricultural drip tapes are formed from relatively thin, flexible, continuous plastic strips folded over and seamed along a longitudinal edge to establish a primary flow path. One or more secondary flow paths are typically formed within the primary flow path by fixing discrete emitter devices along the length of the tape or hose, or by applying parallel strips of plastic material within the hose interior (for example, in the area of the longitudinal edge overlap to form a secondary flow path. It is generally the case that the primary flow path is connected to the water supply with inlets and outlets to and from the secondary flow path, so that water flows from the primary path to the secondary flow path, and then out of the drip tape in a controlled fashion. Some tape constructions employ turbulence inducing regions in the secondary flow path to prevent clogging and reduce the sensitivity of the flow rate to pressure changes.

Drip irrigation hoses or tapes are well represented in the patent literature, and examples may be found in U.S. Pat. Nos. 3,870,236; 3,896,999; 4,009,832; 4,247,051;4,430,020; 4,473,191; 4,874,132; 4,880,167; 4,984,739; 5,163,622; 5,181,532; 5,203,503; 5,207,386; 5,282,578; and 5,333,793, Despite the wealth of innovative drip irrigation technology, significant areas of concern remain relating to reliability and cost. For drip tape to be effective and commercially viable, it is essential that the secondary flow path not become clogged with solid matter in the water supply, or by outside debris blocking the outlets. At the same time, to be commercially viable, drip tape must be economical to manufacture.

DISCLOSURE OF THE INVENTION

The present invention relates to a new and improved drip tape construction which offers advantages not found in the drip tape constructions of which we are presently aware. In the exemplary embodiment, continuous lengths of plastic sheet or film are extruded at a predetermined thickness, while at the same time, a plastic hot melt bead is deposited along what will become the interior surface of the drip tape, in a location remote from the subsequently formed overlapped edge seam. During the extrusion of the hot melt bead, and just prior to deposition on the sheet itself, the bead may be pre-formed by means of, for example, a patterned roller, so as to form a plurality of discrete secondary flow paths arranged in end-to-end relationship along the length of the hot melt bead. The sheet is thereafter cut, if necessary, then folded and seamed along overlapped edges to form a tubular drip tape.

Each secondary flow path has a secondary flow channel including inlet, turbulence inducing, and outlet regions, all of which are formed by embossing or otherwise impressing a pattern of recesses and/or depressions on one side of the hot melt bead. The pattern side of the bead is applied face down on the sheet so that the sheet wall itself closes the secondary flow channel except for a plurality of inlets formed in the bead at longitudinally spaced locations along the inlet region. These inlets are arranged perpendicular to the longitudinal axis of the tape, and thus also perpendicular to the secondary flow channel. In the exemplary embodiment, the inlets are located on both sides of the secondary flow channel, in longitudinally spaced relationship, with the inlets on one side of the secondary flow channel offset longitudinally with respect to the inlets on the opposite side of the secondary flow channel. In this exemplary embodiment, the inlet region extends well over half the total length of the secondary flow path, but this dimensional relationship may vary.

The inlet region leads to a turbulence inducing region formed by a series of peaks and valleys on opposite sides of the secondary flow channel, in longitudinally offset relationship so that the peaks on one side of the secondary flow channel in this region project towards the valleys on the opposite side of the flow channel. The peaks projecting from both sides of the secondary flow channel lie along a line through the center of the secondary flow channel in the exemplary embodiment, thus creating a tortuous path which induces turbulence in the secondary flow path. It is this turbulence that dissipates energy and creates zero or near zero pressure discharge to atmosphere. The turbulence also prevents clogging of the secondary flow path by debris or other solid impurities within the primary water supply.

Downstream of the turbulence inducing region, an outlet region is provided which communicates with an elongated slit in the tape wall which allows the water in the secondary flow path to escape in a controlled drip-like fashion. The outlet region, or reservoir, is otherwise axially closed in the downstream direction, thus isolating the path from the inlet region of the next adjacent downstream secondary flow path, and thus also forcing all water to exit via the elongated slit in the tape wall.

One significant feature of this invention is that the secondary flow path is formed of substantially transparent or at least translucent material which allows the user to inspect the tape for clogging. This inspection can occur simply by removing an axial section of the drip tape and cutting it longitudinally so that the user may then fold the tape open to inspect the secondary flow path.

Another feature of the invention resides in the geometry of the secondary flow path in general and the turbulence inducing region in particular, as described in greater detail further hereinbelow.

In its broader aspects, the invention relates to agricultural drip irrigation tape comprising a tubular member defining a primary flow path; a substantially transparent strip member secured to a surface of the tubular member and defining at least one secondary flow path; at least one inlet from the primary flow path to the secondary flow path; and at least one outlet from the secondary flow path to atmosphere.

In another aspect, the present invention relates to drip tape for below (and/or above) ground irrigation comprising an elongated flexible tubular member forming a primary flow path; an elongated substantially transparent strip secured to an interior surface of the tubular member, the strip formed to include at least one secondary flow path; a plurality of inlets in the strip connecting the primary flow path to the secondary flow path; and an outlet in the tubular member connecting the secondary flow path to atmosphere.

In another aspect, the invention relates to agricultural drip tape comprising a tubular member defining a primary flow path; a strip member secured to a surface of the tubular member and defining, with the tubular member, a secondary flow path having a flow channel therein; the secondary flow path including axially aligned inlet, turbulence inducing and outlet regions, wherein the inlet region comprises a plurality of inlet openings formed in opposite sides of the strip, perpendicular to the flow channel, with inlets on one side longitudinally offset from inlets on the other side; and at least one outlet from the secondary flow path to atmosphere.

In still another aspect, the invention relates to drip tape for below ground (and/or above ground) irrigation comprising a sheet of material formed into a tube by overlapping opposite side edges of the strip and bonding the side edges along a longitudinal seam thereby forming a primary flow path; a strip of material bonded to an interior surface of the tube at a location remote from the longitudinal seam; the strip of material and the sheet of material defining a plurality of secondary flow paths within the primary flow path having a radially inner wall defined in part by a reduced thickness portion of the strip and a radially outer wall defined by the tube, each secondary flow path including an inlet region, a turbulence inducing region and an outlet region; the inlet region including a plurality of inlets on opposite sides of the second strip connecting the primary flow path to the secondary flow path upstream of the turbulence inducing region; the outlet region including an outlet in the tube connecting the secondary flow path to atmosphere downstream of the turbulence inducing region.

Additional objects and advantages of the subject invention will become apparent from the detailed description which follows.

BRIEF DESCRIPTION OF THE DRAWINGS

FIG. 3 is a partial plan view of a secondary flow path strip located interiorly of the tube in FIG. 1;

FIG. 4 is an enlarged view of the circled area labeled "4" in FIG. 3;

FIG. 8 is an enlarged detail 8 taken from FIG. 4.

BEST MODE FOR CARRYING OUT THE INVENTION

Figure 1:
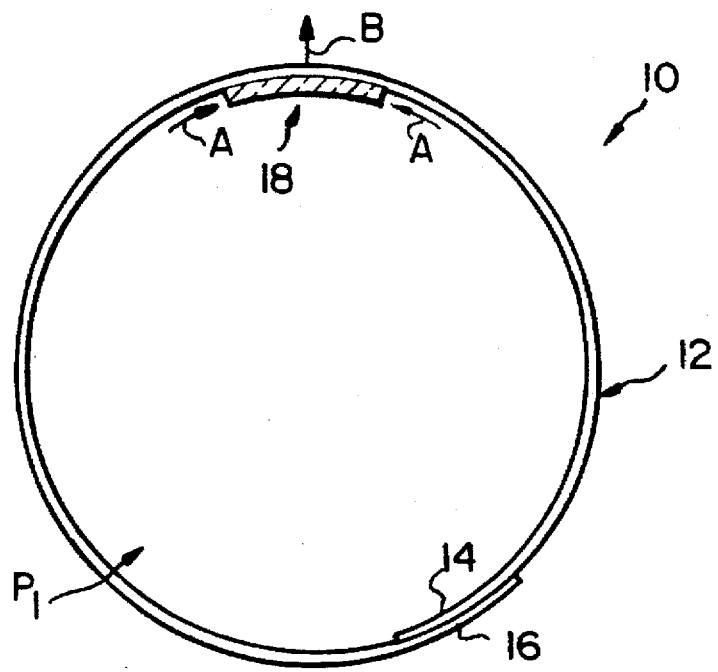
FIG. 1 is a cross section of a drip tape construction in accordance with an exemplary embodiment of the invention.
Figure 2:
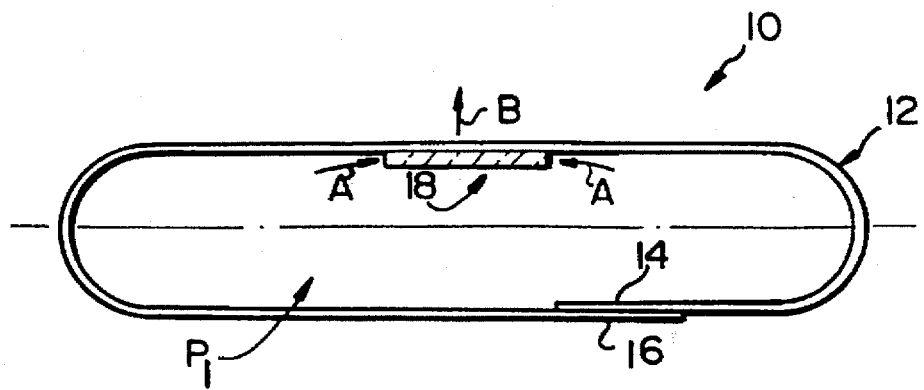
FIG. 2 is a view of the drip tape shown in FIG. 1, but in a partially flattened condition.

Referring to FIGS. 1 and 2, a drip tape configuration in accordance with the invention is shown generally at 10 and includes a flexible plastic sheet or film 12 with opposite longitudinal edges 14 and 16 overlapped and bonded (by, for example, adhesive or by heat sealing) to form a tubular tape or hose with a single longitudinal seam. A longitudinally oriented strip of plastic material 18 is applied to the inner surface of the tape at a location remote from the overlapped seam. The tape itself forms a primary flow path $P_1$ while the strip 18 is preformed to define a plurality of axially aligned secondary flow paths $P_2$ (see FIGS. 3), described further below. The secondary flow paths extend along and parallel to the longitudinal axis of the tape. Generally, water flows into the secondary flow paths from the primary flow path through laterally oriented inlets in both side walls of the strip 18 (see arrows "A"). Water exits the secondary flow paths to atmosphere through longitudinally oriented slits formed in the tape wall (see arrows "B").

Turning now to FIGS. 3–8, the details of the secondary flow paths will be described. The strip 18 in the preferred embodiment may be provided in the form of an extruded hot melt plastic bead having a width of about 0.25", deposited (and bonded) on the "inside" surface of the sheet 12, prior to seaming the overlapped ends 14 and 16. The bead may be preformed prior to deposit on sheet 12, by, for example, extruding the bead onto a roller which subsequently meshes with a second patterned roller to form the individual secondary flow paths along the bead. Thereafter, the bead is deposited onto the sheet surface where it is bonded via the heat of the bead. Tooling may be arranged so that the pre-formed bead is deposited on the sheet as the latter exits its own extrusion die. Of course, other plastic forming methods may be employed as well.

In the exemplary embodiment, the pattern which is embossed or pressed into one side of the strip 18 is best seen in FIG. 3. The pattern defines a plurality of secondary flow paths $P_2$, $P_{2a}$, $P_{2b}$, etc., in discrete longitudinal segments, e.g., about every 12" along the length of the bead or strip. It will be appreciated, however, that the secondary flow paths may be spaced at other intervals, e.g., 4", 8", 12", 24", 36", etc. Each secondary flow path (one shown in FIG. 3) has three distinct regions—an inlet region 20, a turbulence inducing region 22 and an outlet region 24, all within a secondary flow channel 26 running longitudinally or axially through the regions, with a depth of about 0.01". With specific reference to FIGS. 3 and 6, the inlet region 20 of secondary flow path $P_2$ begins at a chevron-shaped end 28, adjacent an isolated chevron 28', thus providing a clear line of demarcation between flow path $P_2$ and the outlet region 30 of the immediately preceding flow path $P_{2a}$. The inlet region extends for well over half of the length dimension of the flow path (i.e., about 9" in the exemplary embodiment, but this dimensional relationship may vary) and includes a plurality of laterally disposed, longitudinally spaced inlets 32 on one side of the strip 18 and a similar number of like inlets 34 on the other side of the strip 18. The inlets 32 on one side of the bead are longitudinally offset from the inlets 32 on the opposite side of the bead thus insuring continuous bead contact with the tape wall. The inlets 32, 34 extend perpendicularly to the secondary flow channel 26 and hence also to the longitudinal axis of the tape. Each inlet has a width dimension of about 0.018", and the inlets on either side are spaced apart by about 0.25".

Axially downstream of the inlet region 20, there is formed the turbulence inducing region 22 which is best seen in FIG. 8. This region, which extends a distance of about 1.9" in the exemplary embodiment has no inlets or outlets other than at the front and back thereof as defined by the flow channel 26, and describes a tortuous path designed to cause turbulent flow which prevents clogging and which dissipates flow energy to create a zero or near zero discharge of water to atmosphere through the outlets described below. The path is formed by a series of asymmetrically arranged arcs, laterally opposed but longitudinally offset from one another, such that pointed peaks 36 project from one side of the channel 26 into valleys 38 between similarly pointed peaks 40 on the other side of the flow channel. More specifically, each "valley" is composed of at least two different radii drawn from different centers (laterally offset from the channel centerline and slightly axially offset as well). As shown in FIG. 1, $R_1$, for example, may be 0.0400" and $R_2$ may be 0.0306". Each valley has a maximum depth of about 0.0281 inch as measured approximately from the centerline of the flow channel. It is further pointed out that, in the illustrated embodiment, all of the peaks 36 and 40 lie on a horizontal line extending through the center of the secondary flow channel 26. The peak-to-peak dimension on each side of the secondary flow channel is about 0.077" while the peak-to-peak dimension of adjacent peaks (alternating sides) is about 0.038". The width dimension of the turbulence inducing region 22 nowhere exceeds the width of the inlet region 20. It is also noted that the relatively larger radius $R_1$ essentially creates a straight line at about a 40° angle to the longitudinal axis of the tape. Here again, the specific dimensions and geometrical relationship may vary.

Running along the turbulence region 22 are grooves 50, 52 which extend the full length of the region 22, on opposite sides of the flow channel 26. These grooves 50, 52, along with chevron 28' and the general arrangement of inlets 32, 34 (on opposite sides of the channel 26) are employed to insure uniform distribution of material during the preforming of the hot melt bead, and to improve the definition of the geometry in the turbulent region. In other words, the grooves insure complete "filling" of the geometry in the turbulent region and make the path integrity much less sensitive to slight variations in the output of the extruder that applies the hot melt bead 18. Uniformity is particularly important in that bulges or other surface discontinuities are prevented which might otherwise negatively impact on the integrity of the seal between the strip 18 and the tape 12, particularly as it relates to the flow channel 26 and the isolation of the secondary flow paths from each other.

Downstream of the turbulence inducing region 22 is the outlet region or reservoir 24 which is formed by smooth channel side walls 42, 44 and which terminates at a closed, pointed end 46 adjacent the chevron 28 of the next adjacent flow path $P_{2b}$. The outlet portion or region of flow path 26 has a greater width dimension than the inlet region 20 (e.g., 0.0800" as compared to 0.0566"), and a length of about 1". Water exits the outlet region 26 (of each secondary flow path) by means of a single elongated slit 48 in the wall of the tape 12, centrally located within the region 24. The slit 48 has a length dimension of about 0.45".

It will be appreciated that FIGS. 3, 4, 6, 7 and 8 show the strip 18 in plan, with the open pattern facing upwardly. It is this face of the strip 18 which is bonded to the interior surface of the sheet 12, so that the secondary flow path 26 is closed along the radially outermost face of the tape. Accordingly, water can enter the secondary flow channel 26 of each path $P_2$ only through inlets 32, 34 and can exit only via the slit 48.

Figure 5:
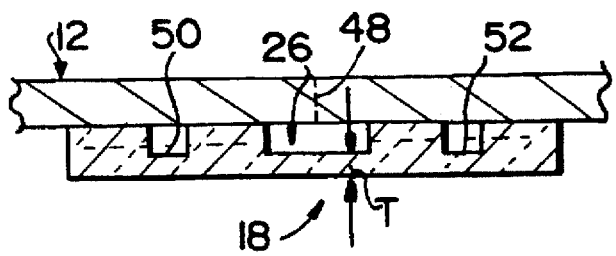
FIG. 5 is a cross section taken along the line 5—5 in FIG. 4, and also showing the exterior tube wall.
Figure 6:
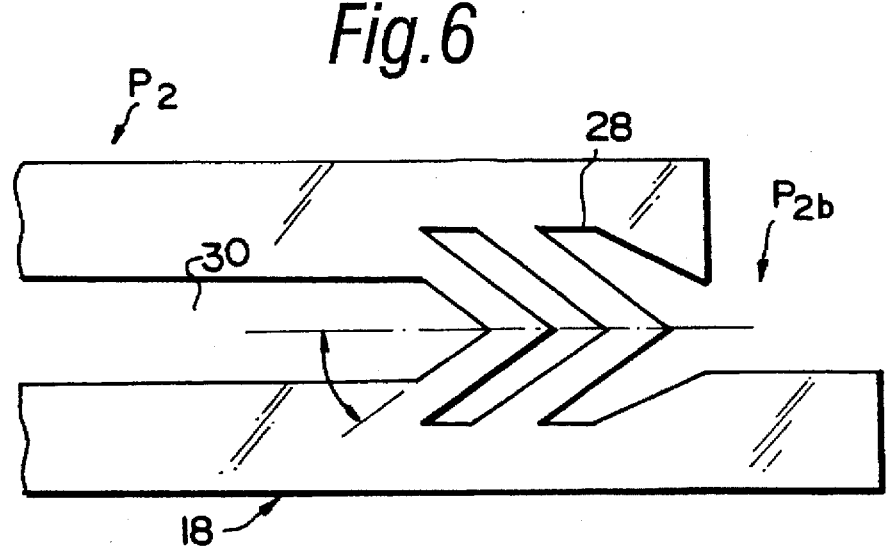
FIG. 6 is an enlarged view of the circled area labeled "7" in FIG. 3.
Figure 7:
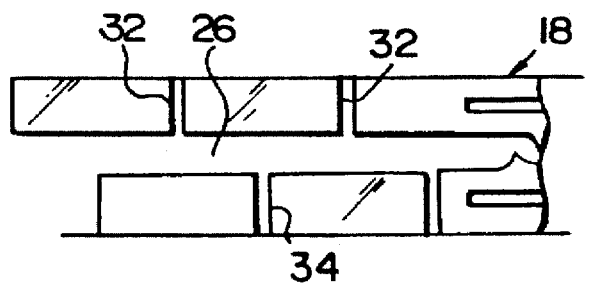
FIG. 7 is an enlarged detail 7 taken from FIG. 3.

With reference to FIG. 5, it may be seen that the thickness of the sheet 12 is essentially equal to the bead thickness T in the flow channel 26. In other words, as shown in FIG. 5, the radially inner and outer walls of the flow path 26 are of substantially the same thickness, e.g., 0.010 inch, such that water pressure changes have little or no impact on the cross sectional sizes of the primary and secondary flow paths.

As already noted, the sheet 18 is preferably transparent (or at least translucent) so that the user can inspect the tape for clogging. This inspection is accomplished by simply removing an axial section of the tape of a few inches or more in length and then cutting the removed section longitudinally so that the strip 18 is clearly visible. Later, a plain length of tape, or similar drip tape section, can be spliced into place.

In the illustrated embodiment of the invention, the sheet 12 is formed of a blend of commercially available polyethylenes. It should be understood that all dimensions and materials recited herein are exemplary only, and may be varied depending on circumstances and objectives. For example, it is well within the skill of the art to engineer material blends (with or without additives) which will meet requirements for specific end use applications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Drip tape for below or above ground irrigation comprising:

an elongated flexible tubular member forming a primary flow path;

an elongated substantially transparent strip secured to an interior surface of said tubular member, said strip formed to include at least one secondary flow path;

a plurality of inlets in said strip connecting said primary flow path to said secondary flow path; and an outlet in said tubular member connecting said secondary flow path to atmosphere.

2. The drip tape of claim 1 wherein a plurality of said secondary flow paths are formed in said strip, in longitudinally spaced, axially aligned relationship.

3. The drip tape of claim 2 wherein each secondary flow path is formed with discrete axially aligned inlet, turbulence inducing, and outlet regions, with a secondary flow channel extending through said regions.

4. The drip tape of claim 3 wherein a plurality of inlets are formed in opposite side walls of the strip in longitudinally offset relationship.

5. The drip tape of claim 4 wherein said inlets extend perpendicular to said secondary flow path.

6. The drip tape of claim 4 wherein said outlet region includes an outlet formed in said tubular member for each of said plurality of secondary flow paths.

7. The drip tape of claim 6 wherein said outlet comprises a single elongated slit.

8. The drip tape of claim 3 wherein said inlet region extends for at least half the length dimension of said secondary flow path.

9. The drip tape of claim 3 wherein said turbulence inducing region comprises a series of peaks and valleys formed in opposite side walls of said secondary flow path, with peaks on one side projecting towards valleys on the other side.

10. The drip tape of claim 9 wherein peaks on opposite side walls lie along a longitudinal axis of the tape.

11. The drip tape of claim 9 wherein each valley is formed by a plurality of radii having different centers.

12. Drip tape for below or above ground irrigation comprising:

a sheet strip of material formed into a tube by overlapping opposite side edges of said strip and bonding said side edges along a longitudinal seam thereby forming a primary flow path;

a strip of substantially transparent material bonded to an interior surface of said tube at a location remote from said longitudinal seam;

said strip of material and said sheet of material defining a plurality of secondary flow paths within said primary flow path having a radially inner wall defined in part by a reduced thickness portion of said strip and a radially outer wall defined by said tube, each secondary flow path including an inlet region, a turbulence inducing region and an outlet region;

said inlet region including a plurality of inlets on opposite sides of said strip connecting said primary flow path to said secondary flow path upstream of said turbulence inducing region;

said outlet region including an outlet in said tube connecting said secondary flow path to atmosphere downstream of said turbulence inducing region.

13. The drip tape of claim 12 wherein a plurality of inlets on opposite side walls of the strip are longitudinally offset relationship.

14. The drip tape of claim 12 wherein said inlets extend perpendicular to said secondary flow path.

15. The drip tape of claim 12 wherein said outlet region includes an outlet formed in said tube.

16. The drip tape of claim 12 wherein said outlet comprises a single elongated slit.

17. The drip tape of claim 12 wherein said inlet region extends for at least half the length dimension of said secondary flow path.

18. The drip tape of claim 12 wherein said turbulence inducing region comprises a series of peaks and valleys formed in opposite side walls of said secondary flow path, with peaks on one side projecting towards valleys on the other side.

19. The drip tape of claim 19 wherein peaks on opposite side walls lie along a longitudinal axis of the tape.

20. The drip tape of claim 19 wherein each valley is formed by a plurality of radii having different centers.

21. The drip tape of claim 1 wherein said strip is provided with means for enhancing uniform distribution of material during formation of the secondary flow path.

22. The drip tape of claim 12 wherein said transparent strip is provided with means for enhancing uniform distribution of material during formation of the secondary flow path.

23. Agricultural drip irrigation tape comprising:

a tubular member defining a primary flow path;

a substantially transparent strip member secured to a surface of said tubular member and defining at least one secondary flow path;

at least one inlet from said primary flow path to said secondary flow path; and at least one outlet from said secondary flow path to atmosphere.

24. Agricultural drip tape comprising:

a tubular member defining a primary flow path;

a substantially transparent strip member secured to a surface of said tubular member and defining, with said tubular member, a secondary flow path having a flow channel therein; said secondary flow path including axially aligned inlet, turbulence inducing and outlet regions, wherein said inlet region comprises a plurality of inlet openings formed in opposite sides of said strip, perpendicular to said flow channel, with inlets on one side longitudinally offset from inlets on the other side; and at least one outlet in said tubular member connecting said secondary flow path to atmosphere.

25. Drip tape for below or above ground irrigation comprising:

an elongated flexible tubular member forming a primary flow path;

an elongated strip secured to an interior surface of said tubular member and formed to include at least one secondary flow path, wherein said secondary flow path is at least partially formed by substantially transparent material;

a plurality of inlets in said strip connecting said primary flow path to said secondary flow path; and an outlet in said tubular member connecting said secondary flow path to atmosphere.

26. Drip tape for below or above ground irrigation comprising:

an elongated flexible tubular member forming a primary flow path;

an elongated strip secured to an interior surface of said tubular member and formed to include at least one secondary flow path, said secondary flow path including discrete, axially aligned inlet, turbulence inducing, and outlet regions, with a secondary flow channel extending through said regions, and wherein a pair of elongated grooves are formed in said strip, on either side of said turbulence inducing region, in order to enhance uniform distribution of material during formation of said elongated strip;

a plurality of inlets in said strip connecting said primary flow path to said secondary flow path; and an outlet in said tubular member connecting said secondary flow path to atmosphere.

* * * * *